United States Patent [19]

Suchdev et al.

[11] Patent Number: 4,771,875
[45] Date of Patent: Sep. 20, 1988

[54] MULTI ELEMENT ROTOR FOR A CENTRIFUGAL CLUTCH

[75] Inventors: Lakhbir S. Suchdev, Charlotte, N.C.; Jack E. Campbell, Fort Mill, S.C.; Li-Hsiung Liu, Matthews, N.C.

[73] Assignee: Textron Inc., Providence, R.I.

[21] Appl. No.: 48,594

[22] Filed: May 11, 1987

[51] Int. Cl.⁴ .............................................. F16D 43/18
[52] U.S. Cl. ......................... 192/105 CD; 192/107 T
[58] Field of Search ................. 192/105 CD, 105 BA, 192/107 T

[56] References Cited

U.S. PATENT DOCUMENTS

| | | | |
|---|---|---|---|
| 1,795,135 | 3/1931 | Molly | 192/105 CD |
| 1,917,775 | 7/1933 | Pfluger | 192/105 CD |
| 2,670,829 | 3/1954 | Bruestle | 192/105 BA |
| 2,762,484 | 9/1956 | Hare | 192/105 CD |
| 3,712,438 | 1/1973 | Roddy et al. | 192/105 CD |
| 3,718,214 | 2/1973 | Newman | 192/105 CD |
| 3,945,478 | 3/1976 | Kellerman et al. | 192/105 CD |
| 4,016,964 | 4/1977 | Dietzsch et al. | 192/105 CD |

FOREIGN PATENT DOCUMENTS 394508  6/1933  United Kingdom ........ 192/105 CD

Primary Examiner—Rodney H. Bonck
Attorney, Agent, or Firm—Abraham Ogman

[57] ABSTRACT

The invention is directed to a rotor for a centrifugal clutch of the type where the rotor resides inside a drum and engages the drum above a predetermined speed. The rotor comprises a plurality of randomly oriented similar rotor elements each capable of expanding ourwardly independently of one another to engage the drum. The rotor elements are preferably stamped from sheet metal.

4 Claims, 2 Drawing Sheets

MULTI ELEMENT ROTOR FOR A CENTRIFUGAL CLUTCH

The present invention is directed to a rotor for a centrifugal clutch of the type widely used in power equipment such as chain saws to provide a driving connection between an engine and the chain.

Classically a centrifugal clutch comprises a rotor or driving member situated within a drum or driven member. In the chain saw application the rotor is connected to the engine drive shaft. A sprocket is connected to the drum of the clutch with the chain mounted on the sprocket.

At idle or at speeds below a predetermined speed of the engine the rotor rotates within the drum without making contact. As the engine speed increases the diameter of the rotor increases until it comes into contact with the drum. Above the predetermined speed there is sufficient friction between the rotor and the drum so that the former drives the latter.

Several types of centrifugal clutches are described in U.S. Pat. Nos. 2,670,829, 2,762,484, 3,718,214, and 4,016,964. Though the clutches described in these patents differ greatly in design they comprise a single rotor element. In several of the cited patents the rotor is formed from a single relatively thick piece of metal.

In one of the cited patents the rotor is formed from a plurality of elements which are fastened together so that they act in unison as a single rotor element.

In two of the patents cited the rotors are configured in the widely used "S" shape. Though this discussion will involve the S shaped rotor it is understood that the principles of the invention may be incorporated into other configurations.

In summery the invention comprises a rotor or driving member of a centrifugal clutch made up of a plurality of similar rotor elements mounted side by side. Each rotor element acts independently of another to engage a drum or driven member at a predetermined engagement speed.

It is a object of the invention to provide a rotor for a centrifugal clutch which avoids the limitations and disadvantages of prior rotors.

It is another object of the invention to provide a rotor for a centrifugal clutch made up of a plurality of rotor elements that independently engage the drum.

It is yet another object of the invention to provide a rotor for a centrifugal clutch which may be manufactured by low cost stamping means.

It is still another object of the invention to provide a rotor for a centrifugal clutch which enables the rotor to work more effectively with drums that have irregular surfaces or surfaces which do not match the surface contour of a rotor element.

It is still another object of the invention to provide a rotor for a centrifugal clutch which enables the rotor to contact the surfaces of the clutch drum in a number of locations resulting in more uniform loading on the drum, thus increasing drum life.

These objects and other objects and advantages of the present invention will appear more clearly from the following specification in connection with the accompanying drawing, in which FIG. 1 is a front view of a centrifugal clutch showing an S rotor situated within a drum.

Figure 1:
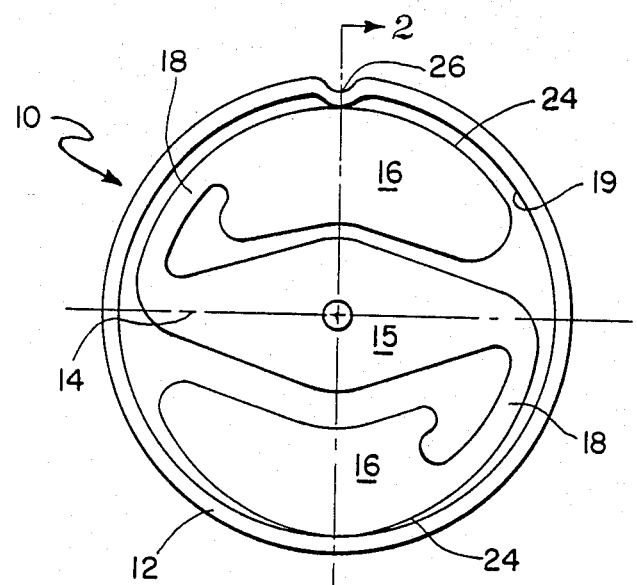

Referring to FIG. 1 there is shown a centrifugal clutch 10 comprising a drum 12 and a rotor 14. In this case the rotor 14 is configured in the widely used "S" shape generically similar to the S rotor described in U.S. Pat. No. 4,016,964 mentioned above the teachings relative to the generic configuration and operation of "s" type clutches are incorporated herein by reference.

The rotor 14 contains weights 16 with an arcuate peripheral edge 24 joined to central hub 15 by springs 18. The peripheral edge 24 conforms to the shape of the inside or friction surface of the drum 19.

The drum 12 includes a central disc 20 with a cylindrical rim 22 joined to the circumference of the disc 20.

In normal practice the rim would be a right cylinder so that the circumferential edge 24 of the rotor would conform to the rim fully to maximize the transfer of rotational force from the rotor 14 to the drum 12.

For purposes of illustration a dimple 26 has been formed in the drum 12. The dimple is intended to represent a depression in the rim 22 which may have been formed through careless handling or defective manufacture. With a single rotor shown in FIGS. 1 and 2 when the rotor 14 expands in response to increasing speed of rotation to engage the drum 12 the edge 24 will contact only the dimple 26. In this illustration the rotor torque is transferred to the drum 12 through the minimal friction area represented by the point contact between the edge 24 and the dimple 26.

Figure 2:
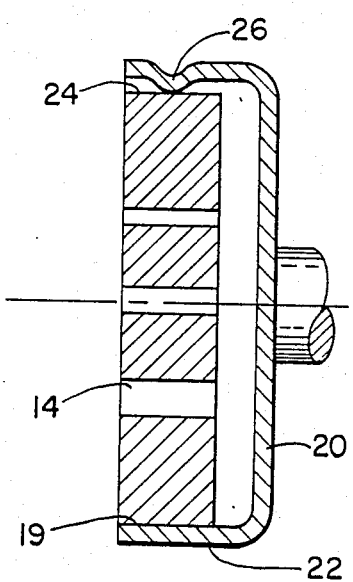
FIG. 2 is a side view of the FIG. 1 clutch taken along line 2—2.

The foregoing conclusion assumes that the bottom edge 24 of the rotor 14 does not contact the drum rim 22. In the absence of any defect the bottom weight 16 is in full contact with the drum as seen in FIG. 2. Nevertheless, it is clear that the friction area is greatly reduced.

Figure 3:
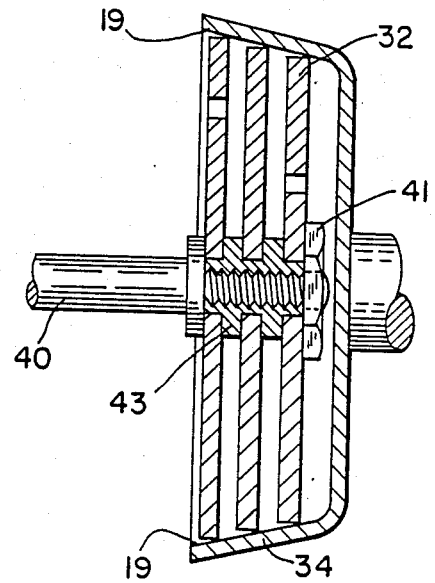
FIG. 3 is a sectional view of a centrifugal clutch containing a plurality of rotor elements positioned within a drum.

FIG. 3 shows a rotor 28 comprising three rotor elements 32 situated within a drum 30. In this case the rim 34 of the drum is not a true cylinder. The rim 34 is shown as a highly exaggerated truncated cone again for purposes of illustration.

Figure 4:
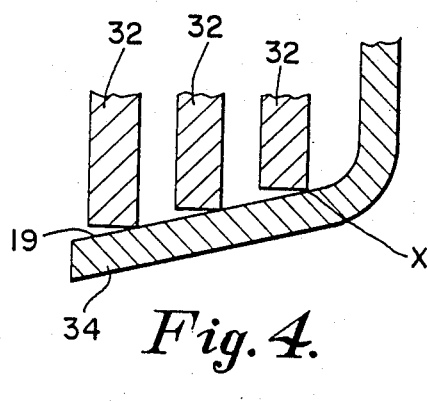
FIG. 4 is an enlarged view of the lower end of the FIG. 3 configuration.

Each of the rotor elements 32 are essentially identical in structure and operation. That is to say that both weights will be in contact with the drum firction surface above the predetermined speed. The rotor elements are mounted on a common drive shaft 40 so that they rotate in unison as a single rotor element. However their respective weights expand independently. In the FIG. 3 illustration it will be noted that each rotor elements 32 are in contact with the friction surface 19 offering three areas of contact with the friction surface 19. See in particular FIG. 4.

The rotor elements 32 are mounted in a random fashion on the shaft 40 for better compliance with an uneven friction surface. The rotor elements are held in compression by the nut 41. Spacers 43 separate each of the rotor elements though this is not essential.

Randomly stacked rotor elements also create a more uniform load on the drum. In addition any unbalance in a rotor element manufacture is evenly distributed reducing vibration.

It is quite apparent that if the rotor 28 was a single element its peripheral edge would contact the drum 30 at point X only. See FIG. 4.

Figure 5:
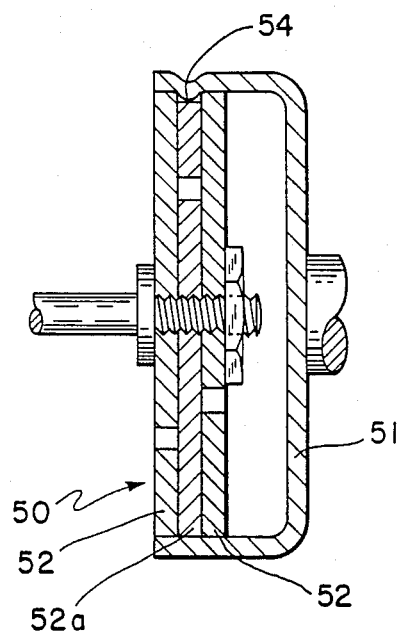
FIG. 5 is another section which is useful in describing a feature of the invention.

Another feature of the invention is illustrated in FIG. 5. In FIG. 5. there is a rotor 50 made up of three rotor elements 52. In this illustration there are no spacers between the rotor elements 52. The elements 52 may be designed so that there is insufficient friction between the elements to prevent each of the elements 52 from operating independently.

The point made by FIG. 5 is made by noting that the dimple 54 is in contact only with the center rotor element 52a. The other rotor elements 52 are fully engaged with the drum 51. Comparing this multi-element rotor of FIG. 5 with the single element rotor of FIG. 2 it is seen that the area of contact of the rotor 52 in FIG. 5 is greater than the area of contact of the rotor 14 in FIG. 2.

The rotor elements 32 are preferably sheet metal stampings. This is a very inexpensive method of making the rotor elements. Stamping also insures a high degree of similarity between elements thus assuring that the weights on a rotor element will both engage the friction rim of the drum above the predetermined or designated speed of rotation.

However the rotor elements may also be castings, a pressed metal part, or a molded part. Any material, whether metal or not, having the desired physical properties will work.

Further a randomly stacked multi-element rotor gives a more uniform load on the durm. This construction distributes any defects on an element which would cause unbalance. This in turn would reduce vibration induced by imbalance.

It is of course, to be understood that the present invention is, by no means limited to the specific showing in the drawing, but also comprises any modification within the scope of the appended claims.

We claim:

1. In a centrifugal clutch comprising a rotor situated within a cup shaped drum having a rim oriented essentially parallel to an axis of rotation, the rim having an interior friction surface, the improvement comprising: a rotor oriented orthogonal to the axis of rotation with its peripheral edge spaced from the friction surface said rotor having a plurality of similar unitary rotor elements each having oppositely disposed weights joined to a central hub by a spring, each of said elements being adapted to be mounted side by side about the axis of rotation with each rotor element being adapted to expand outwardly independently of another to engage the friction surface as the speed of rotation exceeds a predetermined value, each of said hubs having means for mounting the rotor element to a shaft such that side by side weights may be angularly displaced relative to each other.

2. In a centrifugal clutch as defined in claim 1 each rotor element is a metal stamping.

3. In a centrifugal clutch as defined in claim 1 each rotor element is shaped as an S.

4. A centrifugal clutch as defined in claim 1 where the rotor includes in addition a central drive shaft and said rotor elements are randomly mounted to a drive shaft for simultaneous rotation.

* * * * *